United States Patent [19]

Suzuki et al.

[11] 4,003,348
[45] Jan. 18, 1977

[54] ROTARY INTERNAL COMBUSTION ENGINE

[76] Inventors: Yukimasa Suzuki, 357, Kawawa-cho, Hamamatsu, Shizuoka; Rikuro Arai, Room No. 3, Kojimaso, 20-8, Minami-Yahata 3 chome, Ichikawa, Chiba, both of Japan

[22] Filed: Dec. 23, 1974

[21] Appl. No.: 535,712

[30] Foreign Application Priority Data

Dec. 28, 1973 Japan .............................. 49-4105

[52] U.S. Cl. ........................... 123/8.31; 123/8.41; 123/8.49; 418/195
[51] Int. Cl.² ........................................ F02B 53/00
[58] Field of Search ............... 123/8.27, 8.31, 8.49; 418/195, 197

[56] References Cited

UNITED STATES PATENTS

| 757,300 | 4/1904 | Hangl | 418/195 |
|---|---|---|---|
| 1,284,768 | 11/1918 | Powell | 418/195 |
| 2,158,933 | 5/1939 | Good | 418/195 X |
| 2,779,318 | 1/1957 | Strader | 418/195 X |
| 2,944,533 | 7/1960 | Park | 123/8.49 |
| 3,477,414 | 11/1969 | Marin | 123/8.27 |
| 3,708,249 | 1/1973 | Luthi | 418/195 X |
| 3,897,756 | 8/1975 | Upchurch | 418/195 X |

FOREIGN PATENTS OR APPLICATIONS

| 152,114 | 6/1904 | Germany | 123/8.31 |
|---|---|---|---|

*Primary Examiner*—William L. Freeh
*Assistant Examiner*—Michael Koczo, Jr.
*Attorney, Agent, or Firm*—Orville N. Greene; Frank L. Durr

[57] ABSTRACT

A rotary internal combustion engine which comprises a casing, a main shaft journalled in said casing, a rotor mounted on said main shaft for rotation therewith and having in its periphery alternate twisted and sloped recesses and walls, shafts mounted in said casing and extending normal to said main shaft and rotary partition discs mounted on said second-mentioned shafts on the opposite sides of said rotor and having twisted and sloped peripheral faces for sealing contact with said twisted and sloped recesses and twisted walls of the rotor in turn, said recesses and walls and discs cooperating with each other in defining compression chambers in which gaseous fuel is compressed, ignited and exploded.

7 Claims, 15 Drawing Figures

ROTARY INTERNAL COMBUSTION ENGINE

BACKGROUND OF THE INVENTION

Figure 1:
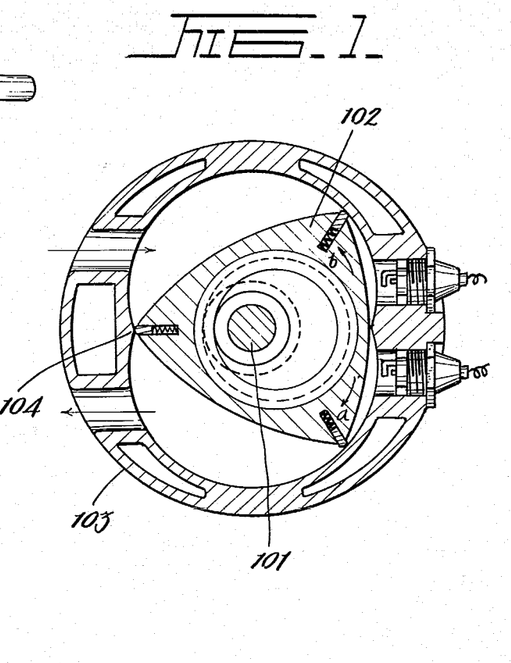
FIG. 1 is a cross-sectional view of one typical prior art rotary internal combustion engine.

This invention relates to a rotary internal combustion engine. There have been proposed and practically employed a variety of rotary internal combustion engines and in a typical prior art rotary internal combustion engine, as illustrated in FIG. 1 of the accompanying drawings, a rotor 102 is eccentrically mounted on a main shaft 101 which is in turn journalled in a casing 103. In the prior art rotary internal combustion engine, explosive force is applied on the main shaft 101 not only in the rotation direction $a$ of the shaft, but in the opposite direction $b$ to thereby impede the rotation efficiency of the main shaft resulting in excessive consumption of fuel. And the projection 104 formed in an intermediate position on the inner surface of the wall of the casing 103 is easily subjected to wear which leads to damage of the engine. Furthermore, in the prior art rotary internal combustion engine, exhaust gas can not be discharged satisfactorily and since the rotor eccentrically rotates with respect to the main shaft, the rotor is subjected to centrifugal force resulting in undesirable vibration of the rotor.

SUMMARY OF THE INVENTION

Therefore, one principal object of the present invention is to provide a novel and improved rotary internal combustion engine which is different from the conventional rotary internal combustion engine and in which a rotor is rotated in a true circle locus.

Another object of the present invention is to obtain a higher rotational force by providing at least two casings each housing one rotor therein, utilizing at least one of said casing for compressing gaseous fuel and the other casing for exploding the compressed fuel.

Another object of the present invention is to provide a rotary internal combustion engine in which as the rotor makes one complete rotation, the ignition and explosion of the gaseous fuel occur at several areas to thereby obtain a very high rotation force for the rotor.

Another object of the present invention is to provide an economical rotary internal combustion engine of the type in which when the gaseous fuel is to be compressed, compression chambers defined by the inner wall of the casing and the alternate walls and recesses of the rotor are maintained in their sealed condition to thereby improve the compression efficiency and prevent leakage of the gaseous fuel.

Another object of the present invention is to provide a relatively simple rotary internal combustion engine which comprises as its principal components a casing, a rotor mounted 3c in their on a main shaft journalled in the casing and rotary partition discs mounted on separate shafts journalled in the casing on the opposite sides of the rotor and in which the inner wall of the casing, the rotor and rotary partition discs define compression chambers therebetween.

According to the present invention, there has been provided a rotary internal combustion engine comprising a rotor having in its periphery alternate twisted and sloped recesses and twisted walls and adapted to rotate in a plane describing a true circle locus and rotary partition discs provided on the opposite sides of said rotor and having the peripheral faces for, in succession, sealing contact with said twisted and sloped recesses and twisted walls as said disc rotate describing a true circle locus in a plane normal to said plane in which said rotor rotates whereby said recesses, walls and discs cooperate with each other in defining compression chambers wherein gaseous fuel fed there is compressed, ignited and exploded.

The above and other objects and attendant advantages of the present invention will be more readily apparent to those skilled in the art from a reading of the following detailed description in conjunction with the accompanying drawings which show preferred embodiments of the present invention for illustration purpose only, but not for limiting the scope of the same in any way.

PREFRRED EMBODIMENTS OF THE INVENTION

The present invention will be now described referring to the accompanying drawings and more particularly, to FIGS. 2 through 5 inclusive in which the first or basic embodiment of rotary internal combustion engine constructed in accordance with the present invention is shown.

In these Figures, reference numeral 1 denotes a framework on which all the components of the internal combustion engine are supported. The casing 3 of the rotary internal combustion engine of the invention is suitably supported and a prime mover or main shaft 2 extends horizontally and transversely of the casing 3 and is suitably journalled therein. As more clearly shown in FIG. 2, the casing 3 consists of upper and lower half casing portions 3a and 3b which have similar semi-cylindrical concave recesses 3c formed their contacting surfaces respectively to define an opening in which a rotor 4 of which description will be made in detail hereinafter is rotatably received and supported on the main shaft 2. The opposite or inner surfaces of the half casing portions 3a and 3b are also formed with horizontal recesses in which rotary partition discs 5 and 6, of which detailed description will be made hereinafter, are received and with vertical bores for receiving vertical shafts 7 and 8 which rotate the rotary partition discs. The upper and lower half portions 3a and 3b are connected together by means of bolts 9 and nuts 9' to complete the casing 3.

The rotor 4 is formed in its periphery with diametrically opposite twisted and sloped recesses 4b and 4b leaving twisted walls 4a therebetween which walls are always in sealing contact with the semi-circular recesses 3c so that said recesses 3c the twisted recesses 4b of the rotor and rotary partition discs 5, 6 cooperate to define two compression chambers 10 and 11. The rotary partition discs 5 and 6 are formed in their periphery with twisted and sloped faces 5a and 6a in the form of a propeller, respectively, which are adapted to sealingly contact the walls 4a and recesses 4b of the rotor 4 so that the partition discs 5 and 6 rotate as the rotor 4 rotates while maintaining the compression chambers 10, 11 in their sealed condition. Thus, the rotation axis of the partition discs 5 and 6 is normal to that of the rotor 4.

The vertical shafts 7 and 8 which rotate the rotary discs 5 and 6, respectively, are journalled at the lower ends in the framework 1 by means of bearing 12 and carry bevel gears 13 at a point slightly above the lower ends. A pair of spaced and parallel shafts 15 and 15 which are journalled in the framework 1 extend below and parallel to the main shaft 2 and have at one end bevel gears 14 in meshing engagement with the bevel gears 13 of the vertical shafts 7 and 8. The shafts 15 also carry spur gears 16 inwardly of the ends where the bevel gears 14 are provided and the spur gears 16 are in meshing engagement with a common larger gear 17 mounted on the main shaft 2. Thus, it will be noted that as the main shaft 2 is rotated, the vertical shafts 7 and 8 are simultaneously rotated from the main shaft 2 through the gear arrangement to rotate the rotary partition discs 5 and 6 whereby as the partition discs 5 and 6 rotate, the propeller-shaped peripheral portions 5a and 6a of the discs engage in turn and maintain their sealing contact with the twisted and sloped recesses 4b and twisted walls 4a to thereby always maintain the compression chambers 10 and 11 in their sealed condition.

Ignition plugs 18 and 19 are provided in association with the compression chambers 10 and 11, respectively and the ignition plugs are positioned offset with respect to the center of the rotor 4 so that when the twisted walls 4a, 4a pass by the ignition plugs, gas is prevented from passing from one twisted and sloped recess 4a opposite from the other twisted and sloped recess 4a to the other. In order to supply gaseous fuel into the compression chambers 10 and 11, fuel supply pipes 20 and 21 extend through the half casing portions 3a and 3b, respectively, with their fuel discharge ends opening into the disc receiving recesses in the half casing portions. Thus, the gaseous fuel from a carburetor (not shown) is fed through the pipes 20 and 21 into the compression chambers 10 and 11. In FIG. 1, reference numerals 22 and 23 denote exhaust pipes, respectively.

In order to block the flow of gas through the pipes 20 and 21 when the gaseous fuel supplied into the compression chambers 10 and 11 is ignited by the ignition plugs 18 and 19, valves 24 are provided in the rotary partition discs 5 and 6. As more clearly shown in FIGS. 5A and 5B, each of the valves 24 has an upper face 24a in contact with the inlet end 25 of each of the fuel supply pipes 20, 21 and provided with an arcuate opening 24b. The opening 24b is in communication with an open notch 24d formed in the peripheral wall of the valve 24. The arrangement is so made that when the fuel pipe intakes the fuel therein, the fuel transfer communication is established between the forward end or intake end 25 and the arcuate opening 24b whereby the fuel is allowed to flow through the open notch 24d into the associated compression chamber and when an explosion occurs, the inlet end 25 of the pipe is blocked by the upper face 24a of the valve 24 and the communication between the pipe and compression chamber is blocked by the peripheral wall of the valve 24. In other words, the fuel is simultaneously supplied to both the compression chambers 10 and 11 and compressed simultaneously in the compression chambers and thus, the ignition and explosion occur simultaneously in both the compression chambers whereby the main shaft 2 is initially forcibly rotated by a cell motor (not shown), and thereafter, the main shaft 2 positively continues to rotate.

Figure 2:
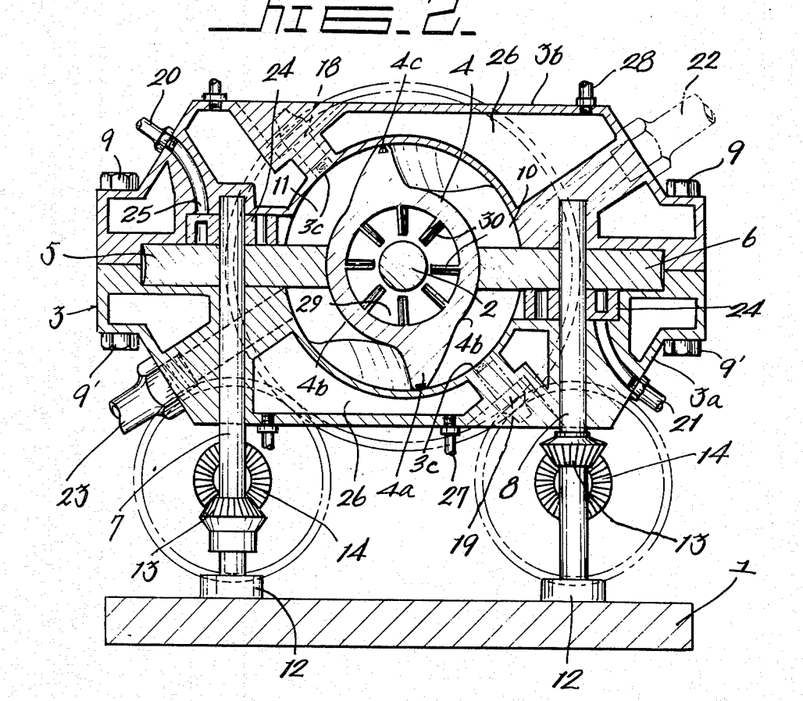
FIG. 2 is a front elevational view in vertical section of a first or preferred embodiment of rotary internal combustion engine of the present invention.
Figure 3:
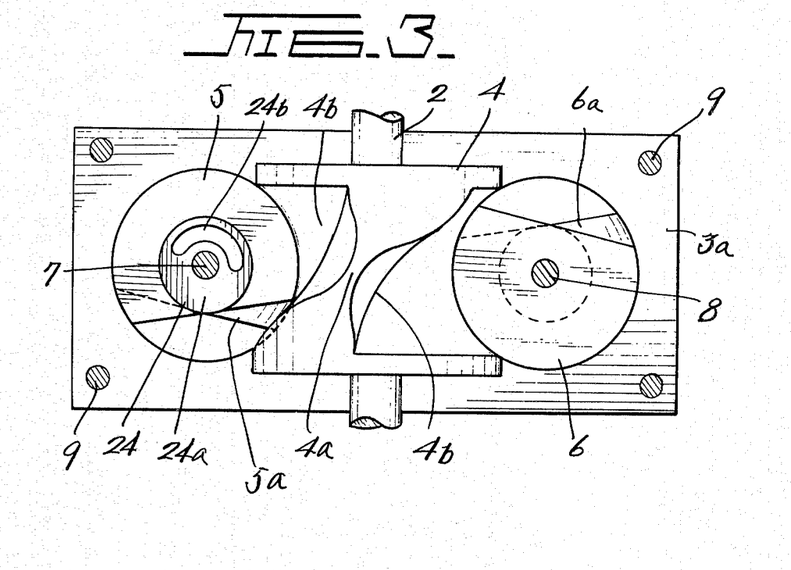
FIG. 3 is a plan view of said internal combustion engine as shown in FIG. 2 with the upper half portion of the casing removed therefrom.
Figure 4:
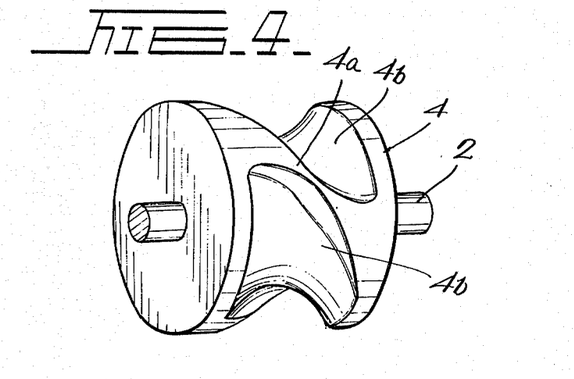
FIG. 4 is a fragmentary perspective view of the rotor incorporated in said rotary internal combustion engine of FIG. 2.
Figure 5A:
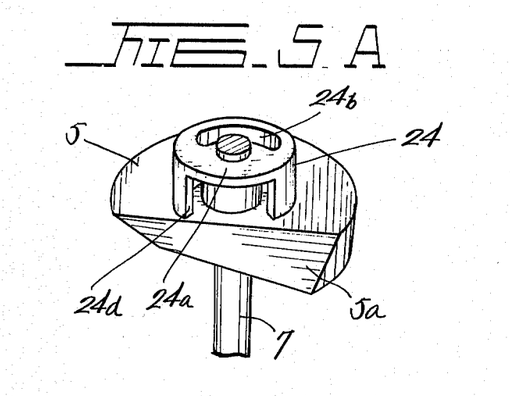
FIG. 5A is a perspective view of the rotary partition disc incorporated in said rotary internal combustion engine as shown in FIG. 2.
Figure 5B:
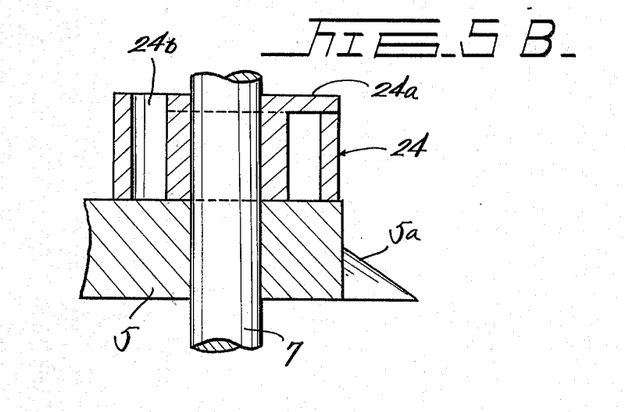
FIG. 5B is a cross-sectional view of said rotary partition disc of FIG. 5A.

As more clearly shown in FIG. 2, the half casing portions 3a and 3b are also formed with cooling water receiving spaces 26 which are defined between the compression chambers 10 and 11 and cooling water supply pipes 27 and water discharge pipes 28 extend through the half casing portion 3a and 3b into the spaces 26 in order to circulate the cooling water through the spaces 26. The rotor 4 is also provided with a cooling water receiving space 29 within the hollow interior of the rotor and cooling water supply and discharge pipes (not shown) extend through the rotor 4 into the space 29 with a suitable fluid tight seal interposed between the rotor and pipes to thereby continuously supply cooling water to the rotor 4 while the latter is rotating. In order to agitate the cooling water within the space 29, eight agitation fins 30 extend radially and inwardly from the inner periphery toward the center of the rotor 4.

When the above-mentioned operation cycle including the supply of gaseous fuel to the compression chambers 10, 11, the ignition and explosion of the fuel within the chambers to rotate the rotor 4 and the discharge of the fuel is repeated, the rotary partition discs 5, 6 function to partition the compression chambers 10 and 11 maintaining their sealing contact with the twisted and sloped recesses 4b and twisted wall 4a of the rotor 4 in turn as the discs rotate in timed relationship to the rotation of the rotor.

According to the present invention, the rotor 4 can be rotated in a vertical plane and the rotary discs 5 and 6 rotated in a horizontal plane throughout the rotation of the rotor and discs without changing the relationship therebetween and the discs always maintain their sealing contact with the rotor without obstructing the rotation of the rotor. Furthermore, the rotor 4 rotates describing a true circle locus to thereby eliminate loss of pressure. And the resultant force generated by the explosive pressure caused through the contact between the peripheries of the rotor and rotary partition discs functions to oppose pressure through the rotary partition discs which rotate in a horizontal plane to thereby accelerate the rotation of the walls on the rotor in their predetermined direction.

As mentioned hereinabove, since the periphery of the rotor 4 is formed with the alternate twisted walls 4a and twisted and sloped recesses 4b and the outer surfaces of the walls 4a are covered by packings 4c which are in sealing contact with the semi-circular recesses 3c in the half casing portions 3a, 3b, a sealed spaced is defined between the walls 4a and the recesses 4b into which the partition discs 5 and 6 extend. Thus, the volume of the space varies to provide fuel intake pressure.

While the rotor 4 is being rotated by the explosion, as each of the walls 4a on the rotor 4 approaches either one of the partition discs 5 or 6, the volume of the space diminishes.

The rotation ratio between the rotor 4 and rotary partition discs 5, 6 is determined by the ratio between the wheels 16 and 17 or that between the bevel gears 13 and 14. When the rotor 4 is formed with the two twisted walls 4a as in the embodiment illustrated in FIGS. 2 through 5, the rotation ratio is such that when the main shaft 2 makes one complete rotation, the rotary partition discs 5, 6 makes two complete rotations. The cooperative action between the rotor walls 4a, casing semi-circular recesses 3c and rotary partition discs 5, 6 merely allows the supplied gaseous fuel to pass through the compression chambers 10 and 11, but does not effect compression of the fuel and therefore, the partition discs 5, 6 are integrally formed with the valve 24 to supply the fuel.

The above-mentioned compression chambers 10, 11 are so designed that the volume of the chambers gradually diminish from the leading side toward the trailing side as defined in the rotation direction of the rotor 4 and the waste gas after ignition in the compression chambers is perfectly squeezed out of the chambers through the interface between the partition discs, rotor walls and casing inner surface.

Like numbers refer to like parts throughout the specification.

FIGS. 6 through 8B show one example of apparatus incorporating the embodiment as shown in FIGS. 2 through 5 inclusive and in this apparatus, as means for feeding gasified fuel, the compressor Y similar to the engine as shown and described hereinabove (the engine of the first embodiment is generally shown by X herein) is employed and the compressor Y is adapted to feed the compressed gaseous fuel to the engine X. The compressor Y is substantially similar to the engine X of the first embodiment as described hereinabove except that the compressor Y is not provided with the ignition plugs 18, 19 and the fuel suppled from supply pipes 20,21 is compressed and fed to the engine X through fuel-air supply pipes 22' and 23' and inlets 20' and 21' (so as to enhance the explosive force of the engine) and discharged through outlets 22,23. Thus, since the construction and arrangement of the rotor 4, casing 3, rotary partition discs 5, 6 and valves 24 of the compressor Y are identical with the corresponding components of the engine X, detailed description of these corresponding components will be omitted herein.

Figure 6:
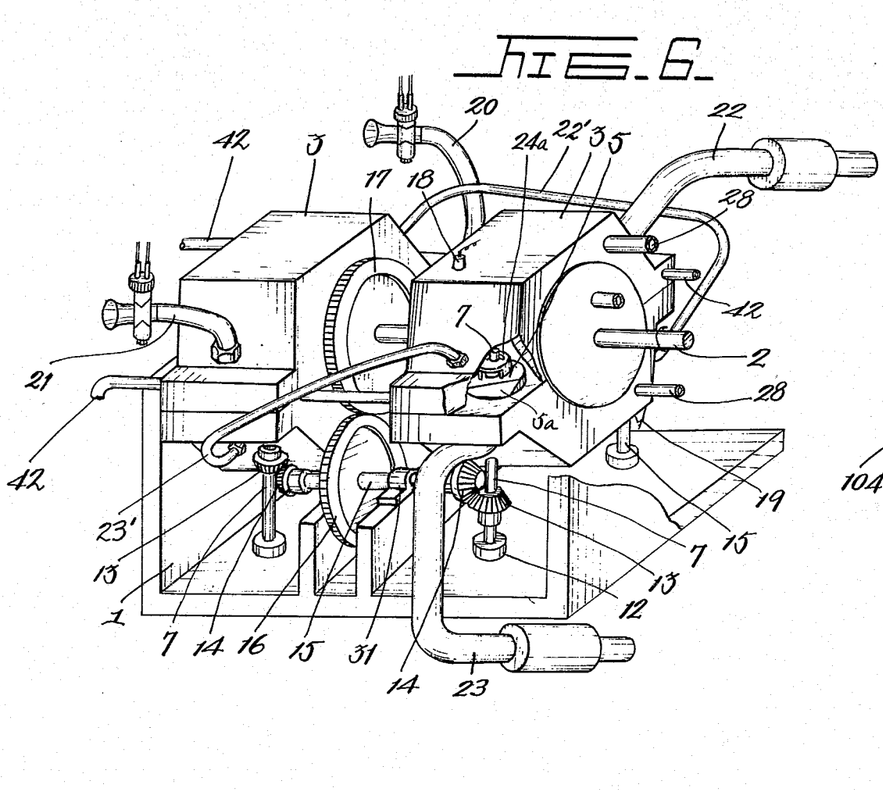
FIG. 6 is a perspective view of an apparatus incorporating the internal combustion engine of the present invention.
Figure 7:
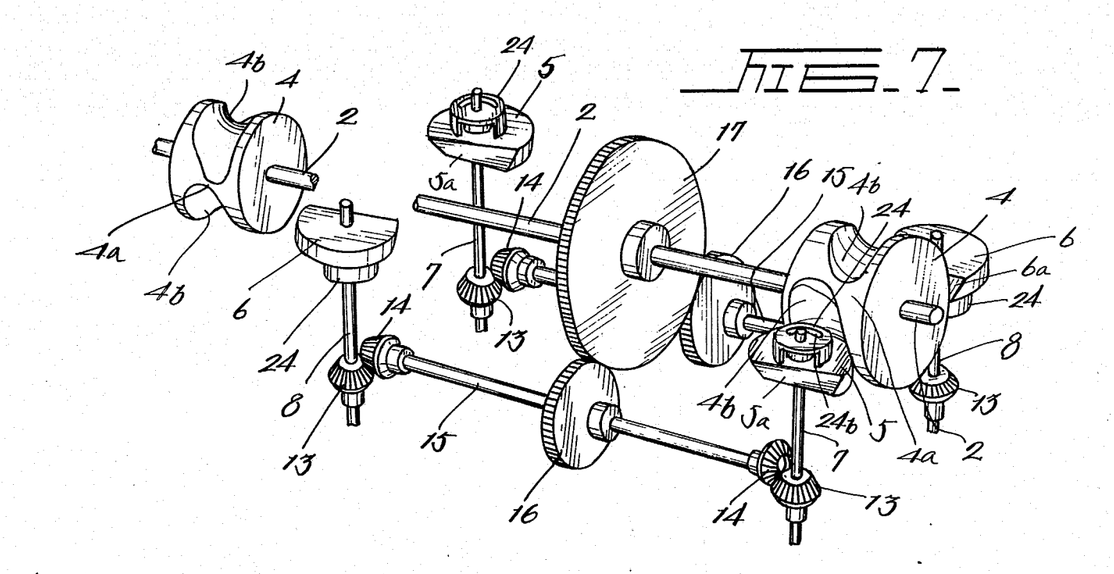
FIG. 7 is a perspective view of the transmission mechanism of said apparatus of FIG. 6.
Figure 8A:
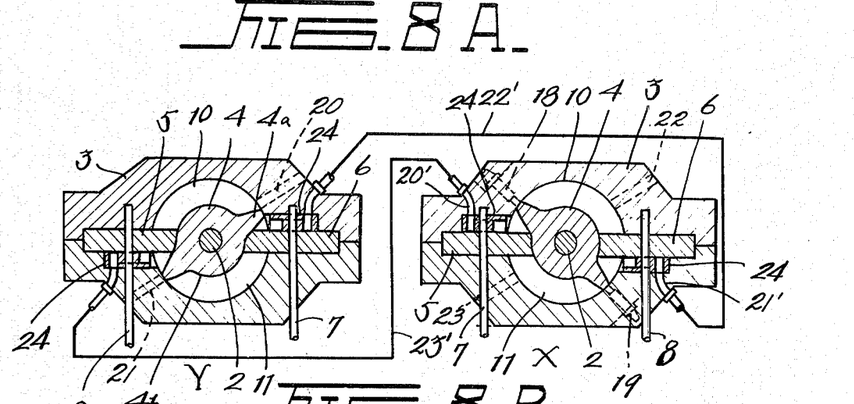
FIGS. 8A and 8B are cross-sectional views showing the internal combustion engine of the invention in different operative positions.
Figure 8B:
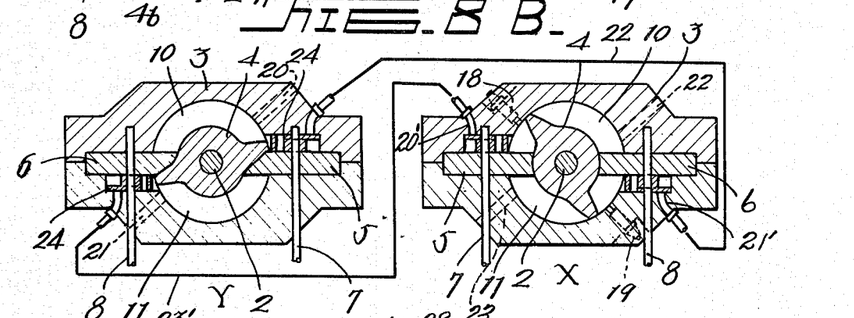

The rotors 4, 4 of the engine X and compressor Y are mounted on their associated juxtaposed transverse shafts 2, 2, respectively which are in turn journalled in their casings 3, 3 in the manner as described hereinabove. The vertical shafts 7, 8 for each of the engine and compressor have the bevel gears 13 which are in meshing engagement with the bevel gears 14 on the transverse shafts 15. As more clearly shown in FIG. 7, the other end of each of the shafts 15 is also provided with a bevel gear 14. The larger wheel 17 on the main shaft 2 associated with each of the engine X and compressor Y serves as the motive mover for the rotary partition discs 5, 6. In FIG. 6, reference numeral 31 denotes the bearing for the shaft 15.

Figures 9, 10:
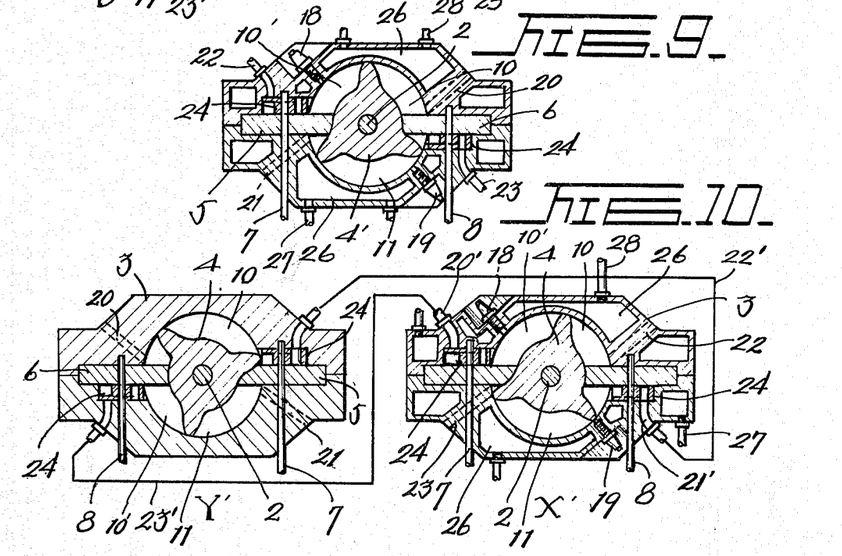
FIG. 9 is a cross-sectional view of a second or modified embodiment of rotary internal combustion engine of the present invention.
FIG. 10 is a cross-sectional view of an apparatus incorporating said rotary internal combustion engine as shown in FIG. 9.

FIG. 9 shows a second or modified embodiment of internal combustion engine of the present invention and this emboidment is substantially similar to the first embodiment except that the rotor 4' is formed in its periphery with each three alternate twisted walls 4a' and twisted and sloped recesses 4b' and that as the main shaft makes one complete rotation, three explosions occur, one in each chamber 10, 10' and 11 and as a result, as the main shaft 2 makes one complete rotation, the rotary partition discs rotate three times.

FIG. 10 shows one example of apparatus in which the internal combustion engine of FIG. 9 is incorporated. As in the example of apparatus shown in FIGS. 6 through 8B, the engine of FIG. 9 (which is generally shown by X' in this Figure) and compressor Y' similar to the engine X' are juxtaposed and mounted on their associated main shafts 2 so that compressed gaseous fuel from the compressor Y' is fed to the engine X'. This arrangement attains the balance of four cycle - twelve cylinders in a reciprocal engine and the rotors of the engine and compressor have to be mounted on their associated shafts 2 in an offset angular relationship to each other in order to attain the compression ratio as mentioned hereinabove. This arrangement is based on the assumption that the volume of the compression chamber on the fuel intake-compression side correspond to that of the compression chamber on the explosion and exhaust side. However, if the volume of the fuel intake-compression side is greater than that of the compression chamber on the explosion-exhaust side, the compression of fuel can be effected angularly without offsetting the rotors with respect to each other.

Figure 11:
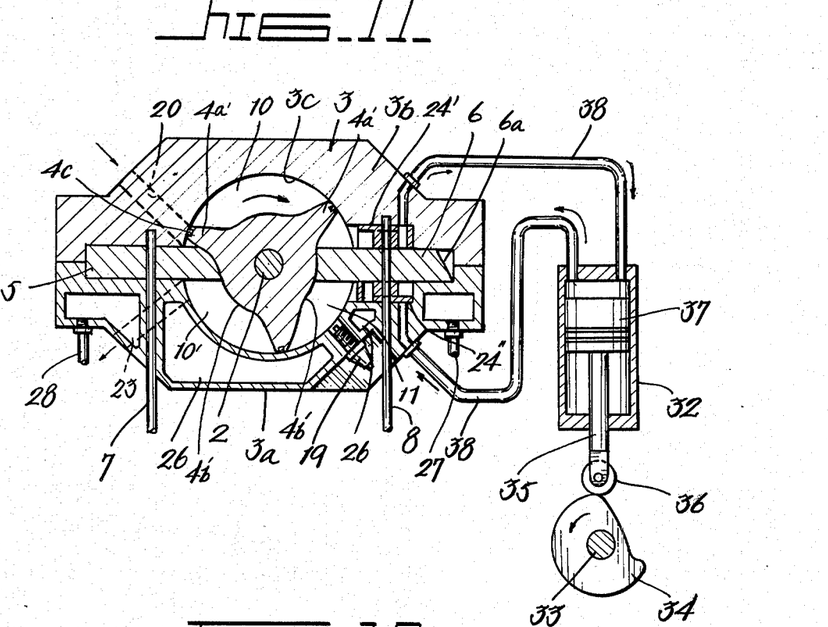
FIG. 11 is a cross-sectional view of a third or further modified embodiment of rotary internal combustion engine of the present invention.

FIG. 11 shows a third or further modified embodiment of internal combustion engine of the present invention in which one rotor performs the fuel intake and compression, explosion and gas exhausting. In this embodiment, a cylinder 32 is provided independently of the rotor and the cylinder 32 receives a piston rod 35 having at the lower end a roller 36 which is in contact with a cam 34 fixedly mounted on a rotary shaft 33 which is in turn suitably journalled in the machine frame (not shown). As the shaft 33 and accordingly, the cam 34 on the shaft rotates, the piston 37 intergral with the piston rod 35 is caused to move reciprocally. The cylinder 32 is connected to the intake and discharge sides of valves 24' and 24'' provided on one of the rotary partition discs 6 through high pressure pipes 38, 38.

The rotary shaft 33 is rotated at the same speed as the rotary partition disc 6 and holds the compressed fuel (which was introduced through passage 20) within the cylinder 32 until one of the twisted walls 4'a passes over the rotary partition disc 6 whereupon the fuel is fed into the combustion chamber to be exploded therein.

Figure 12:
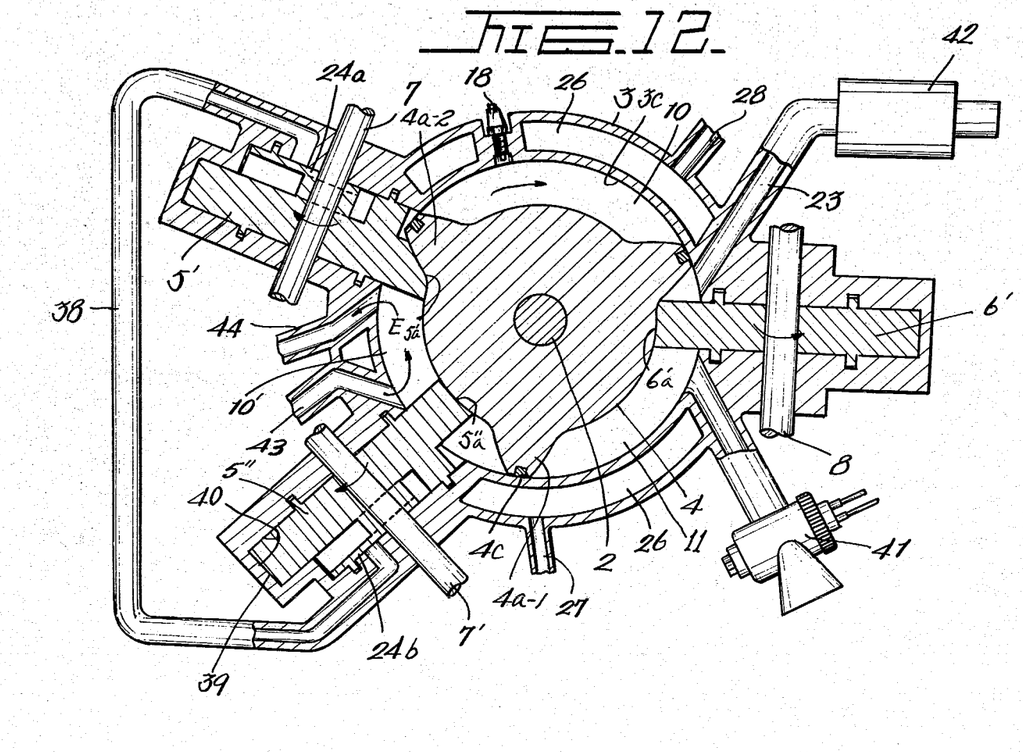
FIG. 12 is a cross-sectional view of a fourth or still further modified embodiment of internal combustion engine of the present invention.

FIG. 12 shows a fourth or still further modified embodiment of internal combustion engine of the present invention in which one rotor performs all the functions, that is, the fuel intake and compression, explosion and gas exhausting and as the rotor makes one complete rotation, explosion occurs three times. Three rotary partition discs 5', 5'' and 6' are provided about the rotor 4 in an angularly spaced relationship. The rotor 4 and rotary partition discs 5', 5'' and 6' rotate in the arrow direction. As the rotor 4 and discs 5', 5'' and 6' rotate in the arrow direction, the concaved peripheral faces 5'a, 5''a and 6'a of the discs frictionally contact the walls on the rotor 4 until the walls pass over the rotor walls. As the rotary partition discs 5'a, 5''a and 6'a rotate in the arrow direction, the land 39 of the twisted peripheral face of each of the discs always maintains a fluid tight seal with respect to the correspondingly shaped face 40 of the recess in the casing of the rotor in a line contact similar to a substantially smooth face contact.

Since the rotor rates continuously, the fuel just about to be sucked into chamber 10 behind the wall 4a-1 of the rotor (in the position shown) has been previously pushed and compressed by the front of the wall of 4a-2 of the rotor because the valve 24c adjacent the wall 4a-2 has been closed until fuel entering chamber 11 from carburetor 41 was compressed to a predetermined condition whereupon said valve 24 opened and the compressed fuel passed to the high pressure pipe 38 (associated with partition discs 5' and 5''). The compressed fuel passes to chamber 10 behind wall 4a-1 as rotation of rotor 4 continues. At this time, valve 24c of disk 5'' and valve 24a of disk 5' are open although valve 24c closes as soon as wall 4a-2 reaches the disc 5''. After wall 4a-1 passes ignition plug 18, the fuel is ignited and valve 24a also closes. Thus, all the additional pressure produced on ignition is used for rotating the rotor. The waste gas is passed out through muffler 42 before new fuel from the carburetor is added in chamber 11. Pipes 43 and 44 feed cooling oil E in the direction of the arrows.

Figure 13:
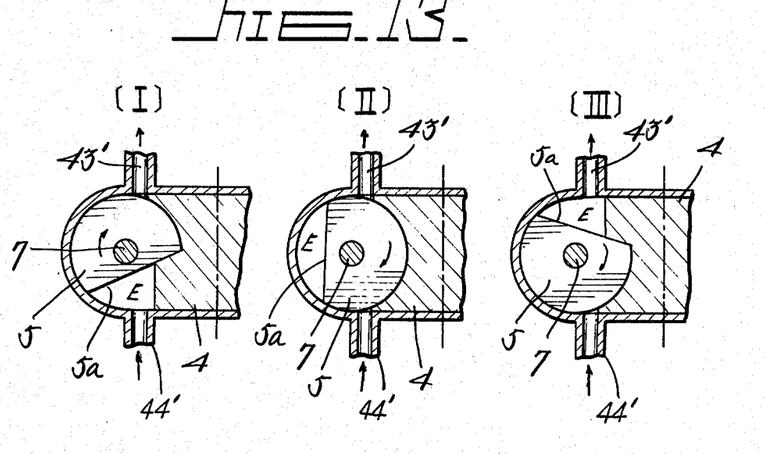
FIG. 13 is an explanatory view in cross-section showing the oil pumping function of the rotary partition cam.

FIG. 13 is a view to explain how the rotary partition disc functions as a oil feeding pump. As the rotary partition disc 5 rotates from the position of FIG. 13 I through the position of FIG. 13 II to the position of the position of FIG. 13 III, the oil E flowing through the cooling oil pipe 44' is sucked in and discharged from the oil supply pipe 43' by the action of the periphery 5a of the rotary partition disc 5.

With the above-mentioned characteristic construction and arrangement of the rotor as the prime mover, the rotary partition discs rotate in timed relationship to the rotor, the valves and related parts so as to allow the rotor and partition discs to move describing a true circle locus. And the rotor and partition discs can move in smooth contact with each other without interference with their rotation. Particularly, the explosive pressure positively acts only in the rotation direction of the main shaft to thereby eliminate loss of power. Furthermore, the number of explosion areas and the frequency of explosion can be optionally selected within a wide range depending upon the number of rotations of the main shaft per unit time. Therefore, on the terms of the number of cylinders, the internal combustion engine is equivalent to a multi-cylinder engine. When a plurality of sets of rotors or several rotors are mounted on the main shaft, the internal combustion engine of the invention can be constructed as a multi-cylinder engine. Thus, if explosion occurs three times at each of the upper and lower explosion areas per rotation of the main shaft, the internal combustion engine of the invention becomes a four cycle-twelve cylinder engine. SInce the prior art rotary engine as refered to in the preface is designed to explode once per rotation of the main shaft, the engine of the invention is equivalent to six cylinders. Thus, it will be understood that the internal combustion engine of the invention can rotate smoothly maintaining a good balance and provide a high output in spite of its small size. In addition, since exhaust gas is forced out of the twisted walls of the rotor by virtue of the specific configuration of the twisted and sloped recesses of the rotor in the engine of the invention, the exhaust gas can be perfectly discharged from the engine.

Furthermore, when gas under a high pressure is blown into the engine of the invention, the engine can be utilized as a gas turbine and in such a case, if the blown gas is a combustible gas, the engine becomes a high output turbine. Still furthermore, the present invention can find its application as a Diesel engine or any pump. Lastly, the engine of the invention is simple in construction and operation and durable. And the engine is small in size and practical.

While several embodiments of the invention has been shown and described in detail, it will be understood that the same are for illustration purpose only and not to be taken as a definition of the invention, reference being had for the purpose to the appended claims.

What is claimed is:

1. A rotary motor device comprising a casing having an internal substantially cylindrical cavity, a rotor within said casing cavity having a shaft extending coaxially therewith and mounted for rotation therein, said rotor having at least two, similarly formed, twisted and sloping recesses therein separated from each other by wall portions which extend substantially to the surface of the casing cavity, at least two disc members mounted for rotation in said casing about axes normal to the axis of said rotor and each positioned so as to project partially into the casing cavity at annularly spaced areas thereof, the peripheries of said disc members being largely circular but cut away at one side to provide a propeller-like twisted and sloped face whereby to enter and leave the ends of the twisted and sloping recesses of said rotor as the rotor and disc members are simultaneously rotated at predetermined synchronized speeds, means for synchronizing the rotation of said disc members with the rotation of said rotor, each of said disk members having a shaft for rotatably supporting the same, said shafts extending normal to the axis of rotation of the rotor shaft, said casing including at least one fuel-feeding passage for feeding fuel to the rotor recesses, said passage being situated adjacent one of the disk members and including a duct extending from outside the casing past the shaft of its nearest disk member and opening into the cavity of said casing, valve means on the shaft of said nearest disk member for rotation therewith and extending into the gas-feeding passage, said valve means being constructed for connecting and disconnecting the duct to the opening into the casing cavity upon rotation of said shaft, at least one ignition plug mounted in said casing with the end thereof adjacent to, but recessed from the periphery of the cylindrical cavity.

2. The rotary motor device as claimed in claim 1, wherein said rotor has two of said similarly formed recesses therein and wherein said casing has two of said disc members, said disk member projecting into the casing cavity from opposite sides thereof.

3. The rotary motor device as claimed in claim 1, comprising a second casing, rotor and disk assembly similar to the first such device, said second device not containing any ignition means, said casing of the second device having a spaced pair of outlet ducts extending from the casing cavity to the outside thereof, and a pair of pipe lines connecting the respective outlet ducts to the respective means for feeding fuel-gas mixtures to the cavities of the rotor of the first device.

4. The rotary motor devices as claimed in claim 3, wherein the means for synchronizing the rotation of the disk members with the rotation of the rotor of said first device are connected to the similar means for synchronizing the rotation of the disk members with the rotation of the rotor of the second device.

5. The rotary motor device as claimed in claim 1 wherein said rotor has at least three similarly formed cavities therein, and comprising three of said disc members, a first and second of said disk members being separated angularly by less than the angular distance between corresponding parts of two adjacent cavities in the rotor, said casing having means for admitting gas to the region between the third and the first disk member, and means for igniting gas between the second and third disc members, pipeline means outside the casing for transporting gas compressed between the third and first disc member to the region between the second and third disk member.

6. The rotary device as claimed in claim 1, wherein said rotor has three annularly formed recesses therein and wherein said casing has two of said disc members projecting into the casing cavity from opposite sides thereof.

7. A rotary motor as claimed in claim 1, wherein the walls of the twisted and sloping recesses in said rotor have a cross-sectional shape defining the arc of a circle and extend substantially the full width of the rotor intermediate the ends of the cavity but slope and twist in opposite directions at the respective ends.

* * * * *